United States Patent [19]

O'Brien et al.

[11] Patent Number: 5,211,060
[45] Date of Patent: May 18, 1993

[54] BIDIRECTIONAL FORCE SENSOR

[75] Inventors: Michael J. O'Brien; William B. Smith, both of Rochester, N.Y.

[73] Assignee: Eastman Kodak Company, Rochester, N.Y.

[21] Appl. No.: 822,817

[22] Filed: Jan. 21, 1992

[51] Int. Cl.[5] .............................................. G01L 5/16
[52] U.S. Cl. ........................ 73/862.044; 73/862.623; 73/862.637
[58] Field of Search .................. 73/862.041, 862.042, 73/862.044, 862.627, 862.629, 862, 632, 862.624, 862.623; 338/5, 2, 3, 4

[56] References Cited

U.S. PATENT DOCUMENTS

| | | | |
|---|---|---|---|
| 3,228,240 | 1/1966 | Ormond | 73/141 |
| 3,230,763 | 1/1966 | Frantzis | 73/141 |
| 3,293,584 | 12/1966 | Legat et al. | 338/2 |
| 3,320,568 | 5/1967 | Russell et al. | 338/2 |
| 3,410,132 | 11/1968 | Hall | 73/88.5 |
| 3,765,230 | 10/1973 | Bohm | 73/88 R |
| 3,872,285 | 3/1975 | Shum et al. | 235/151.11 |
| 4,185,496 | 1/1980 | Tisone et al. | 73/141 A |
| 4,331,035 | 5/1982 | Eisele et al. | 73/765 |
| 4,605,919 | 8/1986 | Wilner | 338/2 |
| 4,884,416 | 12/1989 | Sawicki et al. | 73/862.06 |

Primary Examiner—Donald O. Woodial
Assistant Examiner—R. L. Biegel
Attorney, Agent, or Firm—Mark Z. Dudley

[57] ABSTRACT

A force sensor monitors mutually orthogonal forces during a cutting process. A stationary cutting blade is configured to measure the shearing and perpendicular tearing forces directly during the cutting of web or sheet materials such as film. The blade is designed such that the two forces are decoupled by virtue of the internal relief geometry, and placement of electrical resistance strain gauges which are employed as the sensing elements.

10 Claims, 4 Drawing Sheets

BIDIRECTIONAL FORCE SENSOR

BACKGROUND OF THE INVENTION

1. Technical Field

The present invention relates to sensors that monitor forces during cutting and punching operations of web or sheet materials using electrical resistance strain gauges mounted on the cutting blade or punch.

2. Background Art

Monitoring of cutting forces in machine tool operations has been a common practice to determine tool wear. This is generally accomplished by applying strain gauges directly on the cutting tool or instrumenting the tool mounts. Interaction of forces does not allow the determination of the magnitude of the mutually perpendicular forces (radial and tangential for rotary motions) needed to characterize tool wear. Decoupling of these two forces by tool mount design is accomplished in U.S. Pat. No. 4,884,461 to Sawicki et al for the purpose of monitoring lathe tool wear. Film cutting processes require an extremely stiff support to maintain blade alignment, therefore force measurements via a compliant mount design is not possible. Since blade alignment and wear are indicated by the shape of the cutting force pulse as well as the magnitude, direct force measurement is desired to reduce effects of mount dynamics.

SUMMARY OF THE INVENTION

The object of this invention is to provide a means of directly measuring the radia and tangential cutting forces during film or paper cutting operations. The force sensor employs two strain gauges mounted on orthogonal surfaces of a tungsten carbide block formed to act as a stationary cutting blade. Another two sets of strain gauges are placed at a point of the body where no local strains are present. These gauge sets, along with the active gauges, form opposite legs of a temperature compensated Wheatstone bridge. Relief cuts within the sensor body decouple the radial and tangential forces, provide a stress free area for thermal compensation gauges, and provide a high stiffness transducer that does not affect the cutting operation.

DESCRIPTION OF THE PREFERRED EMBODIMENT

Figure 1:
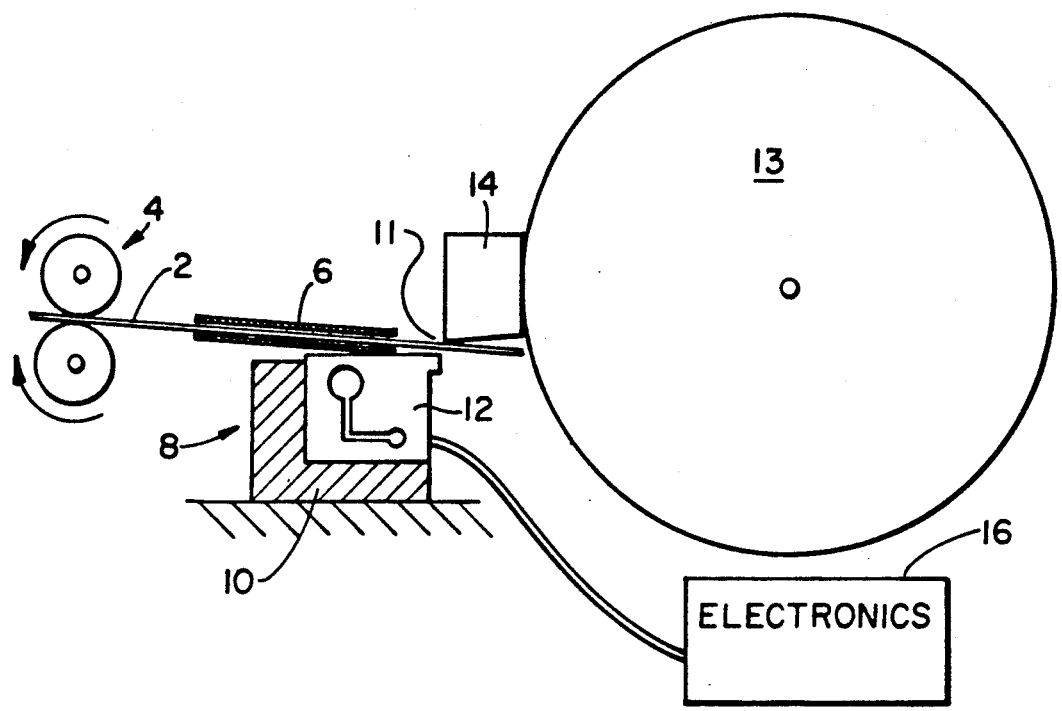
FIG. 1 is an illustration of a typical film or paper cutting apparatus employing the force sensor.

A typical but simplified cutting apparatus is illustrated in FIG. 1 showing the film 2 before a cut. Feed rollers 4 feed film 2 through a guide channel 6 into position over the stationary blade assembly 8 made up of the sensor mount 10 and the sensor/blade 12. A moving blade 14 which may have a linear or rotary motion cuts the film. The blade 14 can be tangentially mounted on a rotating drum 13 as shown in FIG. 1. Measuring electronics 16 monitors the force generated during the cut, conditioning the signal for data acquisition. The force sensor is shown as stationary bu& can also be placed on a rotating drum to facilitate making flying cuts, that is, without stopping the film before making the cut as is necessary with the illustrated mechanism.

Figure 2:
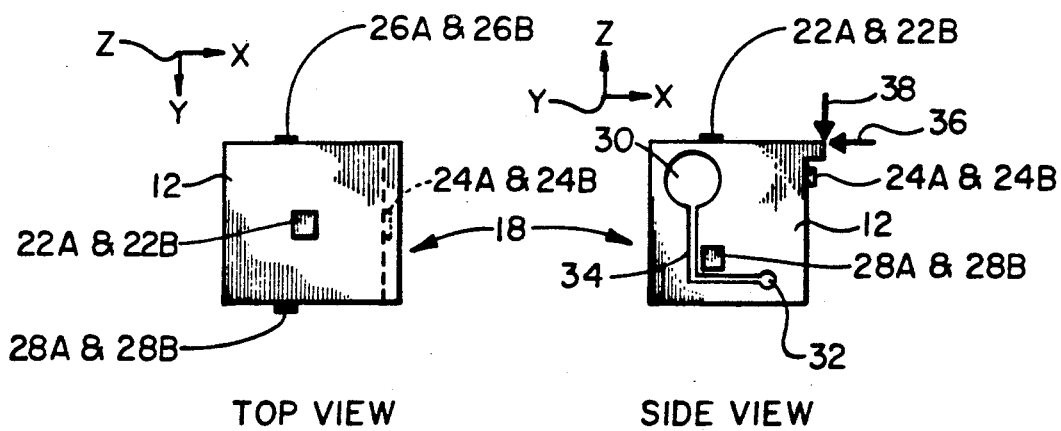
FIG. 2 is a top and side view of the sensor illustrating the strain gauge position and relief geometry.

The actual sensor body 12 which also functions as one of two cutting blades is shown in more detail in FIG. 2. High stiffness and toughness is achieved by making the body out of tungsten carbide, allowing a sharp long life cutting edge 11 to be formed. Relief holes 30 and 32 are chemically milled through the entire sensor body 12, while relief slot 34 is wire electrical discharge machined (EDM). The combination of the degree of blade edge overhang, size and location of relief hole 30 and relief slot 34 are optimized to decouple the cutting forces. Strain gauges 22A and 22B measure strains caused primarily by the horizontal (or radial in the case of rotary motion) force 36 in the X direction. Strain gauges 26A, 26B, 28A, and 28B are placed in a nonstrained area and are used to complete the bridge, thereby temperature compensating the sensor. Strain gauges 22A, 22B, 24A and 24B are centered in the Y direction across the transducer body. Gauges 24A and 24B are placed as close to the cutting edges as possible in the Z direction to maximize sensitivity due to the overhanging blade edge, which also provides clearance for the gauges and wiring. Gauges 22A and 22B are placed such that the edge of the gauge is aligned with the inner edge of the relief hole 30 in the X direction. Gauges 26A, 26B, 28A, and 28B are Placed close to the tip of the relief slot 34 on the main body. Orientation of the gauges is not critical as long as gauges 26A, 26B, 28A and 28D are oriented in the same direction. Gauges 22A, 22B, 24A and 24B must be oriented in the X and Z directions respectively. Any type of strain gauge pair may be employed, however, they must have active areas no greater than $0.1'' \times 0.1''$. Foil type strain gauge pairs such as the Micro Measurements N3K-06-5024F-50C are preferred, semiconductor, thin film or thick film gauges are also applicable. Foil and direct deposited thin film gauges offer the best resolution and linearity at the low strain levels typically encountered.

Figure 3:
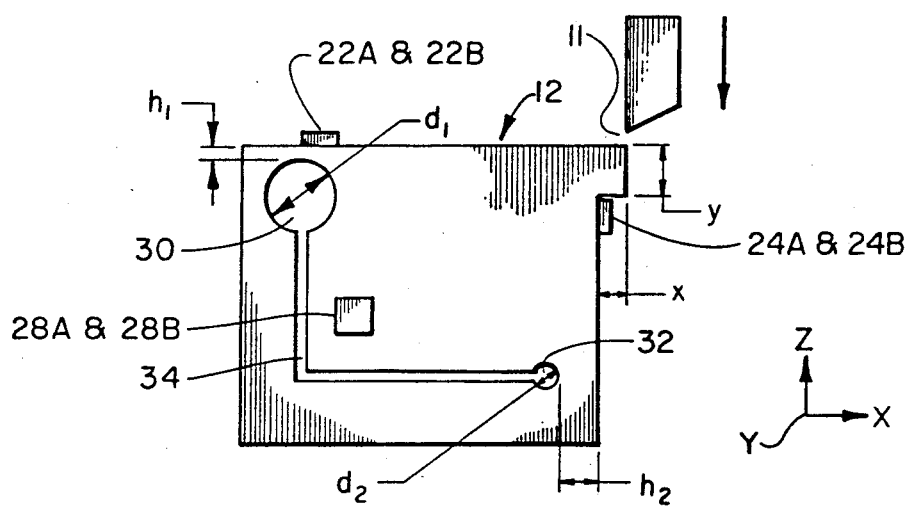
FIG. 3 is a side view of the sensor illustrating some of the more critical dimensions and their relationship to one another.
Figure 4:
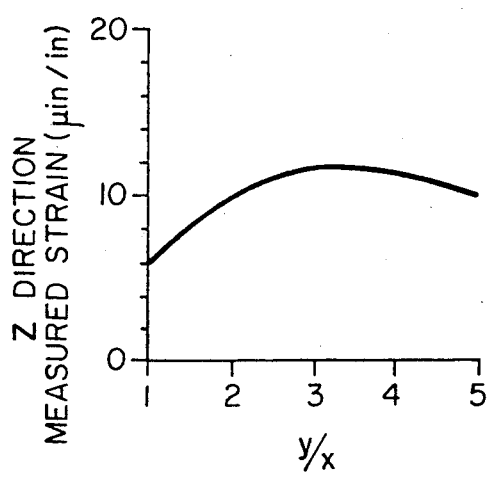
FIG. 4 is a graphic illustration showing how the measured strain in the Y direction is effected by the ratio of y/x where y is the thickness of the cantilevered upper surface and x is the extent which it is cantilevered.
Figure 5:
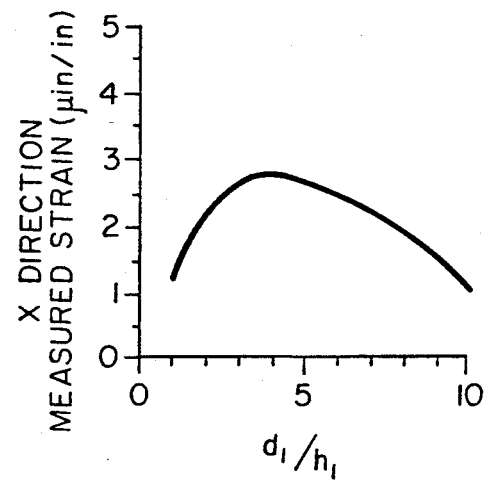
FIG. 5 is a graphic illustration showing how the measured strain in the X direction is effected by the ratio $d_1/h_1$ where $d_1$ is the diameter of the upper transverse hole and $h_i$ is the distance between the front surface of the transducer and the edge of the lower transverse hole.

FIG. 3 shows the critical dimensions that must be adjusted to achieve maximum sensitivity and minimize directional coupling. The diameter of the relief hole 32 is not critical and should be as small as possible. A diameter of 0.067" is employed in this designed and corresponds to the smallest diameter electrode that can be reliably used to EDM (electrical discharge machine) the hole Similarly, the relief slot 34 width is not critical and serves only to isolate the central strain free area from the outside mounting surfaces. The 0.012" width corresponds to the EDM wire diameter. The Y direction stiffness is determined by the section thickness $h_2$, while the X direction stiffness is determined by section thickness $h_1$. Locations of relief holes 30 and 32 are not critical but should be located near the rear and upper surface and near the bottom of the front surface of the transducer body, respectively to minimize directional coupling. The Y direction sensitivity is controlled by the ratio of the thickness of the cantilevered surface y to the amount that the upper surface is cantilevered x. Maximum sensitivity occurs when x is minimized, however, a minimum of approximately 0.030" is required to protect gauges 24A and 24B from the upper cutting blade. FIG. 4 shows that the maximum measured strain and hence sensitivity in the Z direction occurs when the blade height y is approximately three (3) times the cantilever or overhang x. Similarly, the ratio of the large relief hole diameter $d_1$ to the section thickness $h_1$ determines the X direction sensitivity. FIG. 5 shows that the maximum sensitivity occurs when the diameter $d_1$ is approximately four (4) times the section thickness $h_1$.

Figure 6:
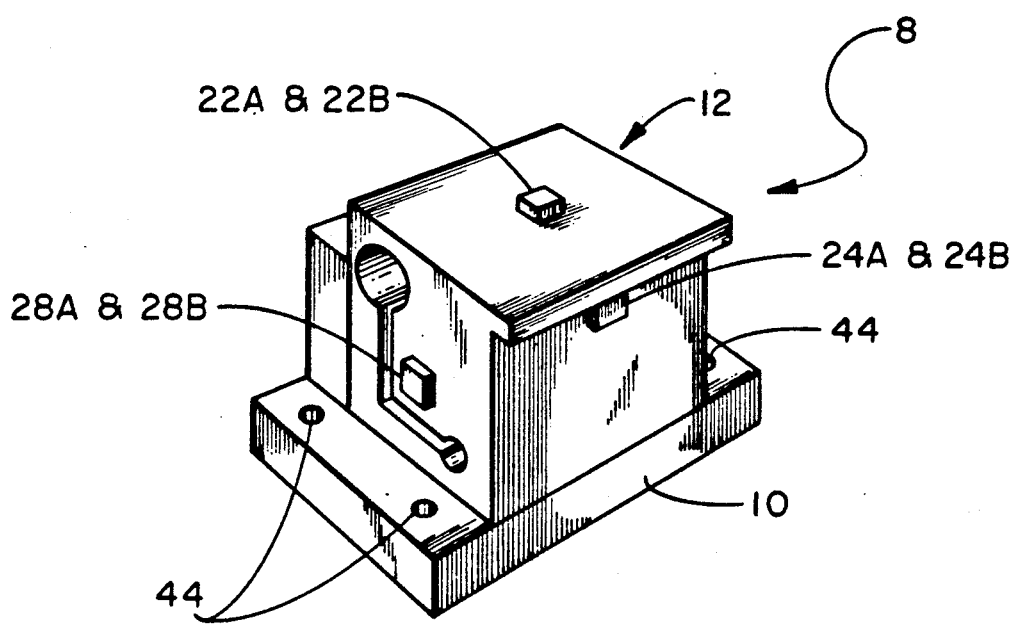
FIG. 6 is an isometric view of the complete sensor blade assembly.

FIG. 6 illustrates a typical mounting configuration for the stationary blade assembly 8. The base 10, made of hardened AISI-4130 alloy steel, or any other tool steel, has mounting holes 44 drilled to facilitate mounting the assembly onto a machine base. All surfaces are ground after the sensor 12 is silver soldered to the mounting base 10. Adverse affects or prestress in the transducer body 12 due to dissimilar rates of thermal expansion between the base 10 and body 12 is minimized by the relief holes 30 and 32, and slot 34. This arrangement produces a transducer with a Z direction stiffness of about $3.4 \times 10^6$ lbf/in and an X direction stiffness of $3.0 \times 10^6$ lbf/in. Other attachment methods such as clamping or fabricating integral mounts as part of the transducer body are also possible.

Figure 7:
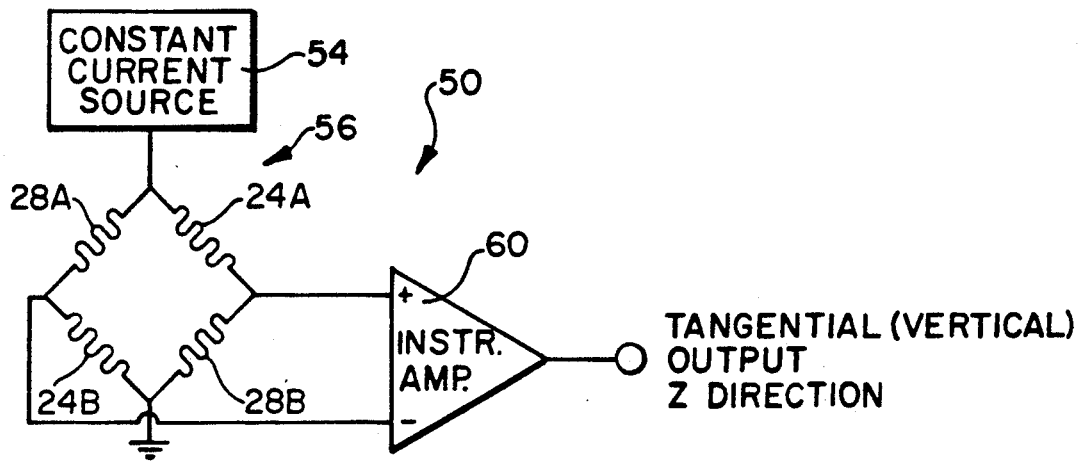
FIG. 7 is a schematic of the bridge and electronics for the vertical output in the Z direction.
Figure 8:
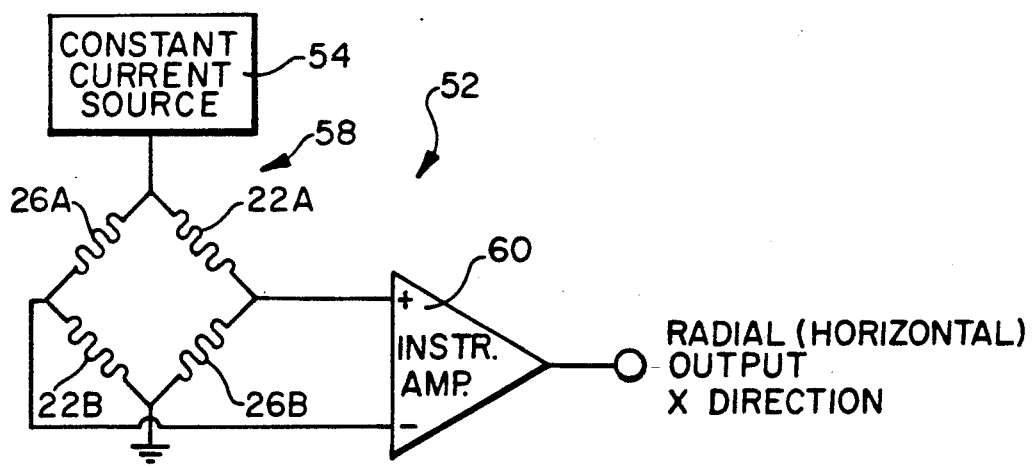
FIG. 8 is a schematic of the bridge and electronics for the radial (horizontal) output in the X direction.

Electronics for the transducer is illustrated in FIG. 7 showing Z direction channel 50 and FIG. 8 showing the X direction channel 52. These are virtually identical with the exception of channel gains (which are set to suit the application) and the gauges making up the Wheatstone bridges. Both channels have a constant current source 54 excitation such as the Burr-Brown REF-200, providing an electrical bridge output proportional to the applied force. The X direction bridge 58 is made up of gauges 22A, 22B, 26A, and 2(B where gauges 26A and 26B are insensitive to the applied force but compensate the bridge for temperature induced strains during operation. Similarly, the Z direction bridge 56 is made up of gauges 24A, 24B, 28A, and 28B where gauges 24A and 24B are active gauges responding to the X direction, force, and gauges 28A and 28B thermally compensate that bridge. A low noise precision instrumentation amplifier such as the Analog Devices AD624 provides a voltage output proportional to the force which is set by the amplifier gain.

Advantages and Industrial Applications

The present invention has sensor stiffness that is several times greater than standard transducers allowing it to be used as an element or blade in the cutting operation. This high degree of stiffness allows transient response characteristics that are similar to that of piezoelectric transducers with the added ability to sense the static as well as the dynamic forces encountered. In addition, the physical geometry of the sensor provides decoupling of the two (Z and X directions) orthogonal cutting forces. This geometry also allows a variety of mounting methods that do not affect sensitivity or linearity.

This force sensor can be used for measuring cutting forces encountered in cutting web and sheet materials such as film or paper in finishing operations. The sensor acts as a one of a pair of cutting blades and is fitted with strain gauges that are used to detect strains resulting from the process of cutting.

What is claimed is:

1. An electromechanical transducer assembly for converting mechanical movement of two relatively movable parts of a mechanical device comprising:
   a sensor block having upper and lower surfaces, front and rear surfaces, and first and second side surfaces;
   a first hole extending from said first side surface to said second side surface and being proximate said upper and rear surfaces;
   a second hole extending from said first side surface to said second side surface and being proximate said lower and front surfaces;
   a relief slot extending from said first side surface to said second side surface and connecting said first and second holes;
   a portion of said upper surface extending in a cantilevered fashion beyond said front surface;
   a first pair of strain gauges mounted on said upper surface and midway between said first and second side surfaces.
   a second pair of strain gauges mounted on said front surface proximate said cantilevered upper surface midway between said first and second side surfaces;
   third and fourth pairs of strain gauges mounted on said first and second side surfaces respectively, each pair being located between said relief slot and said upper and front surfaces and proximate said lower and rear surfaces;
   first and third strain gauge pairs forming a bridge circuit to measure strain in the direction from front to rear in said block; and
   second and fourth strain gauge pairs forming a bridge circuit to measure strain in the direction from said upper to said lower surface.

2. A transducer assembly as set forth in claim 1 wherein the thickness of the cantilevered portion of the upper surface is y and the extent of cantilever is x such that the ratio of y/x determines the sensitivity in a direction orthogonal to said upper and lower surfaces.

3. A transducer assembly as set forth in claim 2 wherein said maximum sensitivity occurs when y is approximately three (3) times x.

4. A transducer assembly as set forth in claim 2 wherein the diameter of said first hole is $d_1$ and the distance from the upper surface to said first hole is $h_1$ and that $d_1/h_1$ determines the sensitivity in a direction that is orthogonal to said front and rear surfaces.

5. A transducer assembly as set forth in claim 4 wherein said maximum sensitivity occurs when $d_1$ is approximately four (4) times $h_1$.

6. A transducer assembly as set forth in claim 1 wherein said lower surface is attached to a mounting plate.

7. A transducer assembly as set forth in claim 1 wherein said first strain gauge pair is aligned with a plane that is tangent to the edge of said first hole farthest from said rear surface and said first strain gauge is located between said plane and said cantilevered portion of said upper surface.

8. A transducer assembly as set forth in claim 4 wherein said sensor block is made of tungsten carbide.

9. A transducer assembly as set forth in claim 8 wherein said strain gauges are the foil type of strain gauge pairs.

10. A transducer assembly as set forth in claim 8 wherein said strain gauges are direct deposited thin film gauges.

* * * * *